(12) United States Patent
Yamashita et al.

(10) Patent No.: US 11,830,989 B2
(45) Date of Patent: *Nov. 28, 2023

(54) BATTERY SYSTEM

(71) Applicant: DENSO CORPORATION, Kariya (JP)

(72) Inventors: Naoto Yamashita, Kariya (JP); Masakazu Kouda, Kariya (JP); Fumihiko Hori, Kariya (JP); Shunichi Kubo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,696

(22) Filed: Jul. 13, 2022

(65) Prior Publication Data

US 2022/0352569 A1 Nov. 3, 2022

Related U.S. Application Data

(63) Continuation of application No. 16/744,462, filed on Jan. 16, 2020, now Pat. No. 11,424,493.

(30) Foreign Application Priority Data

Jan. 18, 2019 (JP) ................................. 2019-007368

(51) Int. Cl.
*H01M 10/48* (2006.01)
*H01M 10/42* (2006.01)
*H02J 7/00* (2006.01)

(52) U.S. Cl.
CPC ....... *H01M 10/482* (2013.01); *H01M 10/425* (2013.01); *H01M 2010/4278* (2013.01);

(Continued)

(58) Field of Classification Search
CPC .......... B60L 2240/547; B60L 2250/10; B60L 2250/16; B60L 3/0046; B60L 58/10;

(Continued)

(56) References Cited

U.S. PATENT DOCUMENTS

2012/0318412 A1 12/2012 Ohta et al.
2014/0091769 A1 4/2014 Kim et al.
(Continued)

OTHER PUBLICATIONS

Dec. 2, 2021 Office Action issued in U.S. Appl. No. 16/829,735.
(Continued)

*Primary Examiner* — Victoria H Lynch
(74) *Attorney, Agent, or Firm* — Oliff PLC

(57) ABSTRACT

In a battery system including an assembled battery having a plurality of battery cells connected in series, each of a plurality of monitoring units includes a voltage classification unit configured to classify a terminal voltage between each pair of input terminals in the monitoring unit as a cell voltage or as a zero voltage that is a terminal voltage of substantially zero. The input terminals in each of all or all but one of the monitoring units include at least one specific terminal pair for acquiring the zero voltage at a different position and/or include a different number of specific terminal pairs for acquiring the zero voltage. Each of the plurality of monitoring units further includes an identifier generation unit configured to generate an identifier based on at least one of the position of the at least one specific terminal pair and the number of specific terminal pairs.

18 Claims, 6 Drawing Sheets

(52) U.S. Cl.
CPC ...... *H01M 2220/20* (2013.01); *H02J 7/00302* (2020.01); *H02J 7/00306* (2020.01)

(58) Field of Classification Search
CPC ... B60L 58/21; H01M 10/425; H01M 10/482; H01M 2010/4278; H01M 2220/20; H02J 2310/48; H02J 7/0013; H02J 7/00302; H02J 7/00306; H02J 7/0048; Y02E 60/10; Y02T 10/70
See application file for complete search history.

(56) References Cited

U.S. PATENT DOCUMENTS

| | | |
|---|---|---|
| 2014/0232413 A1 | 8/2014 | Kitahara et al. |
| 2014/0354291 A1 | 12/2014 | Kikuchi et al. |

OTHER PUBLICATIONS

Apr. 14, 2022 Notice Of Allowance issued in U.S. Appl. No. 16/744,462.
U.S. Appl. No. 16/744,462, filed Jan. 16, 2020.

FIG.3

| MONITORING UNIT | IDENTIFIER ID |
|---|---|
| K1 | (1, ···, 1, 0, 1, ··· 1)  10 ONES   9 ONES |
| K2 | (1, ···, 1, 0, 1, ··· 1)  11 ONES   8 ONES |
| K3 | (1, ···, 1, 0, 1, ··· 1)  12 ONES   7 ONES |
| ⋮ | ⋮ |

FIG.6

| MONITORING UNIT | IDENTIFIER ID |
|---|---|
| K1 | (1, ···, 1, 1, 1)  20 ONES |
| K2 | (1, ···, 1, 1, 0)  19 ONES  1 ZERO |
| K3 | (1, ···, 1, 0, 0)  18 ONES  2 ZEROS |
| ⋮ | ⋮ |

BATTERY SYSTEM

CROSS-REFERENCE TO RELATED APPLICATION

This is a Continuation Application of U.S. patent application Ser. No. 16/744,462, filed Jan. 16, 2020, which, in turn, is based on and claims the benefit of priority from earlier Japanese Patent Application No. 2019-007368, filed Jan. 18, 2019. Those applications are incorporated herein by reference.

BACKGROUND

Technical Field

The present disclosure relates to a battery system.

Related Art

A conventionally known battery system includes an assembled battery having a plurality of battery cells connected in series, for example, in order to meet needs for a wide variety of electric vehicles. The battery system includes a plurality of monitoring units for monitoring the assembled battery. In such a battery system, a controller for controlling the monitoring units needs to identify each monitoring unit for the purpose of state-of-charge monitoring and failure diagnosis for the battery cells served by each monitoring unit.

BRIEF DESCRIPTION OF THE DRAWINGS

In the accompanying drawings:

FIG. 3 illustrates the relationship between monitoring units and identifiers according to the first embodiment;

FIG. 6 illustrates the relationship between monitoring units and identifiers according to the third embodiment.

DESCRIPTION OF SPECIFIC EMBODIMENT

Figure 1:
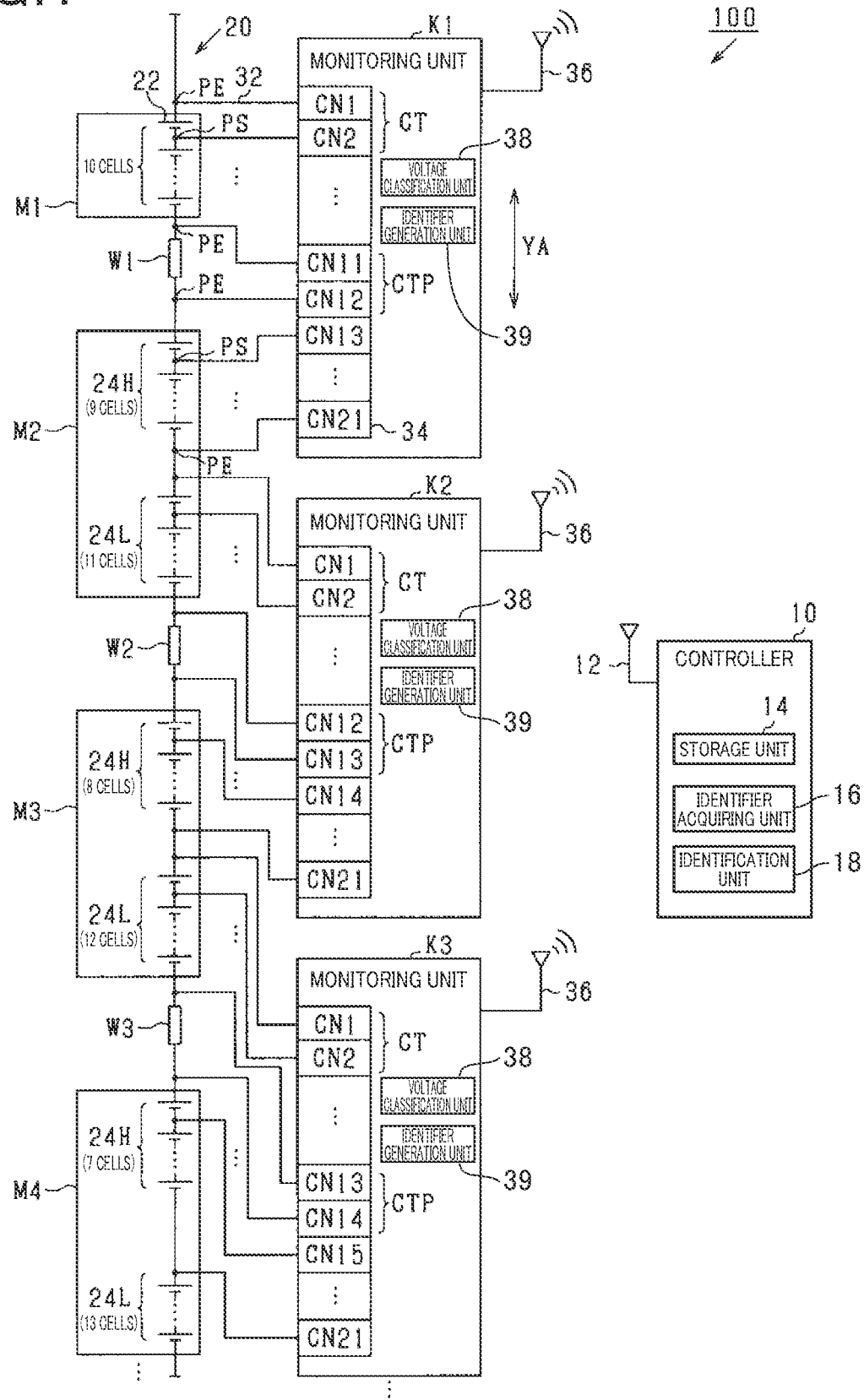
FIG. 1 is a schematic diagram illustrating a vehicle power supply system according to a first embodiment.

In such a battery system as disclosed in Japanese Patent No. 5710013, each monitoring unit has its preassigned unique identifier, and the controller identifies each battery module by the identifier.

For a battery system including a plurality of monitoring units, the monitoring units are desired to be identical for cost reduction. However, the monitoring units described above have preassigned different identifiers and thus cannot be identical.

In view of the foregoing, it is desired to have a battery system that can include identical monitoring units.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

A first embodiment of a battery system according to the present disclosure will now be described with reference to the drawings. A battery system 100 according to the present embodiment is incorporated in a vehicle.

As illustrated in FIG. 1, the battery system 100 includes an assembled battery 20, a plurality of monitoring units K, and a controller 10. The assembled battery 20 has a plurality of battery cells 22 connected in series. More specifically, the assembled battery 20 has a plurality of battery modules M each including two or more battery cells 22, with the battery modules M connected in series via inter-module wires (hereinafter simply the wires) W corresponding to connection members. The battery modules M constituting the assembled battery 20 include a first battery module M1 at the highest voltage end, and the first battery module M1 includes 10 battery cells 22. The battery modules M also include second to fourth battery modules M2 to M4 on a lower voltage side of the first battery module M1, and the second to fourth battery modules M2 to M4 each include 20 battery cells 22.

A monitoring unit K is installed for each predetermined number of battery cells 22. Each monitoring unit K includes a connector 34. The connector 34 includes, for example, 21 input terminals (hereinafter simply referred to as the terminals) CN1 to CN21 arranged in a predetermined direction YA, which is the longitudinal direction of the monitoring unit K. Each terminal CN of the connector 34 is connected to an electric wire line 32 extending from one end of a battery cell 22. The monitoring unit K receives the terminal voltage across each battery cell 22 via the electric wire line 32.

The monitoring unit K acquires, via the connector 34, 20 terminal voltages based on the input voltage (voltage between terminals) at each couple of terminals CN adjacent in the predetermined direction YA, or each terminal pair CT. For example, when one terminal pair CT of the 20 terminal pairs CT included in the connector 34 is connected to both ends of a battery cell 22, the terminal voltage at the terminal pair CT is the terminal voltage across the battery cell 22, or cell voltage VC.

The monitoring unit K includes a communication circuit 36 and wirelessly transmits cell voltage data DV indicating the acquired cell voltage VC to the controller 10. The monitoring unit K also wirelessly receives various instructions from the controller 10 via the communication circuit 36.

The controller 10 will now be described. The controller 10 is configured as a microcomputer including a central processing unit (CPU), a read-only memory (ROM), a random-access memory (RAM). The controller 10 includes functional blocks to control the monitoring units K individually, such as a storage unit 14, an identifier acquiring unit 16, and an identification unit 18 which are described later. In the present embodiment, these functional blocks are implemented by the CPU executing control programs stored in the ROM or the like. In alternative embodiments, these functions may be provided by an electronic circuit which is hardware, where the electronic circuit can be provided by a digital circuit including logic circuits, an analog circuit, or a combination thereof.

The controller 10 can communicate with each monitoring unit K. More specifically, the controller 10 includes a communication circuit 12 and wirelessly receives cell voltage data DV wirelessly transmitted by the monitoring units K. The controller 10 uses the received cell voltage data DV to control the assembled battery 20. For example, the controller 10 uses the received cell voltage data DV to calculate the state of charge (SOC) of the assembled battery 20. The controller 10 then wirelessly transmits an instruction to prevent overcharge or overdischarge of the assembled battery 20 to the monitoring units K via the communication circuit 12.

In the battery system 100, the controller 10 needs to identify the monitoring units K for the purpose of state-of-charge monitoring and failure diagnosis for each of the monitoring units K. In an example discussed below, the monitoring units K are assigned unique identifiers ID. The identifiers ID may be assigned by storing an identifier ID into storage included in each monitoring unit K. In this example, the controller 10 can identify each monitoring unit K by wirelessly communicating with the monitoring unit K to acquire the identifier ID assigned to the monitoring unit K.

For the battery system 100, the monitoring units K are desired to be identical for cost reduction. However, the monitoring units K in the above case have preassigned different identifiers ID and thus cannot be identical.

The battery system 100 according to the present embodiment is intended to solve the problem. The monitoring units K acquire cell voltages VC as well as a zero voltage VZ that is a terminal voltage at a terminal pair CT. More specifically, one of the 20 terminal pairs CT included in the connector 34 is connected to both ends of the corresponding wire W and acquires the terminal voltage across the wire W as a zero voltage VZ. The zero voltage VZ has a voltage value of substantially zero, or more specifically a voltage value lower than a threshold.

In the battery system 100 according to the present embodiment, each monitoring unit K has a specific terminal pair CTP that is a terminal pair CT for acquiring the zero voltage VZ, or in other words, a terminal pair CT connected to both ends of the wire W, and different monitoring units K have specific terminal pairs CTP at different positions. Each monitoring unit K performs an identifier generation procedure for generating an identifier ID based on the position of its specific terminal pair CTP. Thus, the monitoring unit K may not have a preassigned identifier ID in it, which allows the battery system 100 to include identical monitoring units K.

Figure 2:
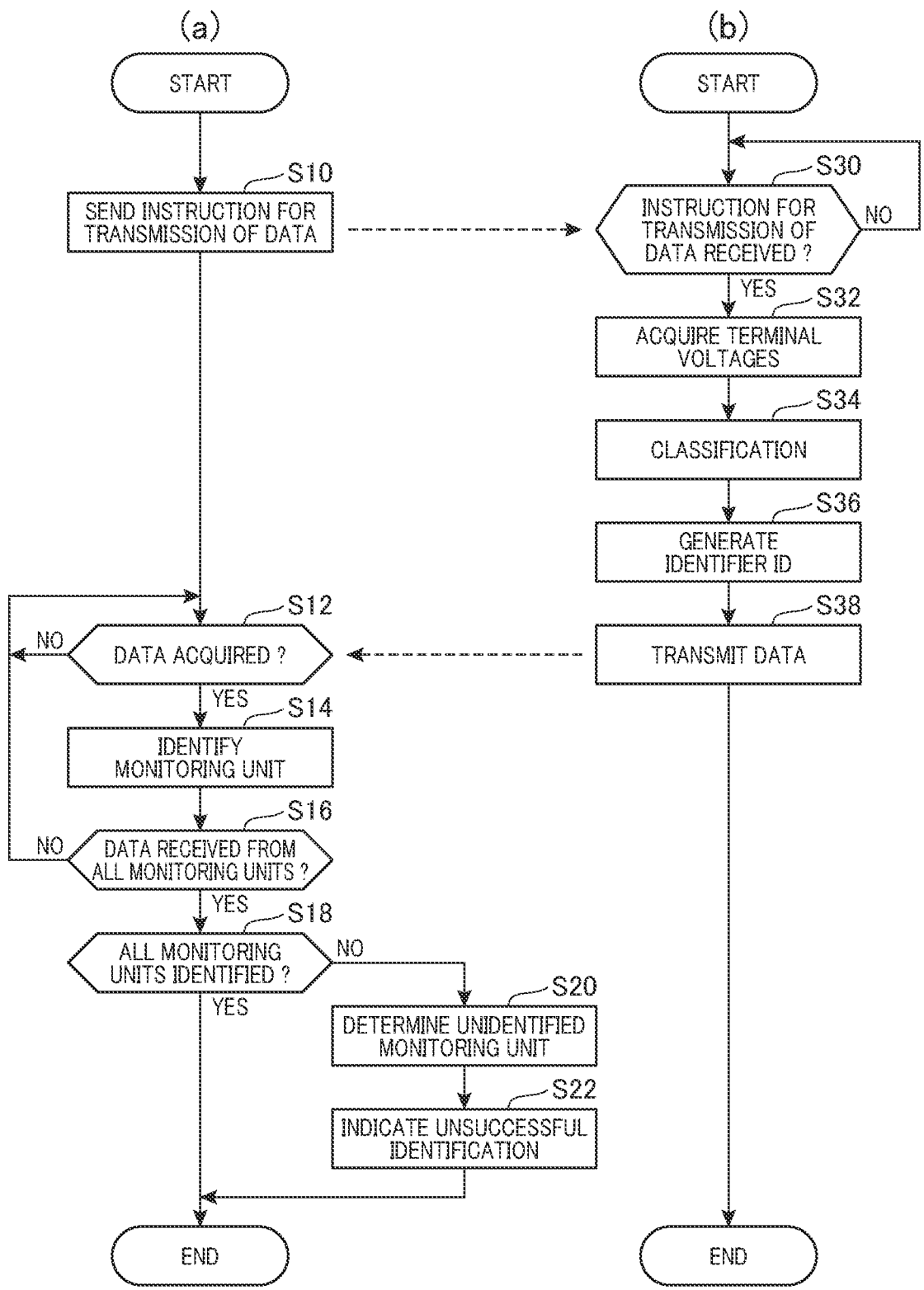
FIG. 2 illustrates flowcharts of an identification procedure and an identifier generation procedure.

FIG. 2 illustrates flowcharts of the identification procedure and the identifier generation procedure according to the present embodiment. The identification procedure is performed by the controller 10 to identify the monitoring units K by identifiers ID generated in the identifier generation procedure. FIG. 2(a) is a flowchart illustrating the identification procedure for the controller 10, and FIG. 2(b) is a flowchart illustrating the identifier generation procedure for the monitoring units K. The controller 10 and the monitoring units K perform their procedures when the vehicle starts up, or the ignition of the vehicle is switched on.

First, the identifier generation procedure for each monitoring unit K will be described. When starting the identifier generation procedure, the monitoring unit K first determines whether the monitoring unit K has acquired an instruction for the transmission of data from the controller 10 in step S30.

If the determination result is negative in step S30, step S30 is repeated. In contrast, if the determination result is positive in step S30, the monitoring unit K acquires each terminal voltage in step S32. Subsequently, in step S34, the monitoring unit K classifies the terminal voltages acquired in step S32 as cell voltages VC and a zero voltage VZ.

In step S34, the monitoring unit K determines whether each terminal voltage is larger than a predetermined threshold voltage VA. The threshold voltage VA is a predetermined constant value, such as 0.5 V. For a terminal voltage larger than the threshold voltage VA, the monitoring unit K determines the terminal voltage as a cell voltage VC and associates the terminal voltage with an identification symbol 1. For a terminal voltage smaller than the threshold voltage VA, the monitoring unit K determines the terminal voltage as a zero voltage VZ and associates the terminal voltage with an identification symbol 0.

In step S36, the monitoring unit K generates an identifier ID. More specifically, the monitoring unit K generates an identifier ID composed of the identification symbols assigned to the terminal voltages in step S34, with the identification symbols arranged in order from the terminal CN1 to the terminal CN21 of the connector 34. This means that, in step S36, each identifier ID is generated based on the position of the identification symbol 0, or in other words, the position of the specific terminal pair CTP for acquiring the zero voltage VZ. In the present embodiment, the position of the specific terminal pair CTP in the connector 34 varies among the monitoring units K. Thus, each monitoring unit K generates a different identifier ID. In the present embodiment, a voltage classification unit 38 (shown in FIG. 1) is responsible for execution of the processing in step S34, and an identifier generation unit 39 (shown in FIG. 1) is responsible for execution of the processing in step S36.

Subsequently, in step S38, the monitoring unit K transmits data including the cell voltage data DV and the identifier ID to the controller 10 and then finishes the identifier generation procedure.

Each monitoring unit K includes, as functional blocks, the voltage classification unit 38 to perform the identification procedure described above and the identifier generation unit 39 to perform the identifier generation procedure described above. These functional blocks may be provided by an electronic circuit which is hardware, where the electronic circuit can be provided by a digital circuit including many logic circuits, an analog circuit, or a combination thereof.

Next, the identification procedure for the controller 10 will be described. When starting the identification procedure, the controller 10 first sends an instruction for the transmission of data to each monitoring unit K in step S10. Subsequently, in step S12, the controller 10 determines whether the controller 10 has acquired the data from each monitoring unit K. In the present embodiment, an identifier acquiring unit 16 in the controller 10 (see FIG. 1) is responsible for execution of the processing in step S12.

If the determination result is negative in step S12, step S12 is repeated. In contrast, if the determination result is positive in step S12, the controller 10, in step S14, identifies the monitoring unit K from which the data has been acquired in step S12. In the present embodiment, an identification unit 18 in the controller 10 (see FIG. 1) is responsible for execution of the processing in step S14.

In step S14, the controller 10 uses a map MP (see FIG. 3) stored in a storage unit 14 (see FIG. 1) in the controller 10 to identify each monitoring unit K by the identifier ID included in the data acquired in step S12. The storage unit 14 is, for example, ROM or rewritable non-volatile memory.

The map MP is information associating monitoring units K with identifiers ID. In the map MP, the identifiers ID for the monitoring units K in the battery system 100 are stored in association with the monitoring units K. In the present embodiment, the map MP does not store identifiers ID unassociated with the monitoring units K in the battery system 100.

Subsequently, in step S16, the controller 10 determines whether the controller 10 has acquired the data from all the monitoring units K included in the battery system 100. If the determination result is negative in step S16, the controller 10 returns to step S12. In contrast, if the determination result is positive in step S16, the controller 10, in step S18, determines whether all the monitoring units K have been identified.

If the determination result is positive in step S18, the controller 10 finishes the identification procedure. In contrast, if the determination result is negative in step S18, or in other words, if any unidentified monitoring unit remains, then the controller 10 determines the unidentified monitoring unit in step S20. In step S20, the controller 10 determines the unidentified monitoring unit by eliminating the identifiers ID used for the identification in step S14 from the identifiers ID stored in the map MP.

In step S22, the controller 10 indicates the occurrence of the unsuccessful identification of the monitoring unit K and finishes the identification procedure. Unsuccessful identification refers to an abnormal phenomenon in which no monitoring unit K can be identified. In the event of unsuccessful identification, the controller 10 cannot appropriately acquire the cell voltages VC at the battery cells 22 associated with each monitoring unit K, failing to appropriately control the assembled battery 20. Thus, the occurrence of unsuccessful identification disables the vehicle from starting normally. The occurrence of unsuccessful identification may be indicated by emitting a warning beep or showing the abnormality on the display of the car navigation system. When the controller 10 indicates the occurrence of unsuccessful identification, the controller 10 notifies the driver of the unidentified monitoring unit determined in step S20. This notification allows the driver to recognize and easily replace the unidentified monitoring unit.

Now referring to FIG. 3, the map MP is illustrated. FIG. 3 indicates a first monitoring unit K1, a second monitoring unit K2, and a third monitoring unit K3 of the monitoring units K included in the battery system 100, and the identifiers ID associated with these monitoring units K1 to K3.

As illustrated in FIG. 1, the first monitoring unit K1 acquires the cell voltages VC at all the battery cells 22 included in the first battery module M1. In addition, among the battery cells 22 included in the second battery module M2, the first monitoring unit K1 acquires the cell voltages VC at the nine battery cells 22 adjacent to the high voltage end (hereinafter, the high-voltage battery cell group 24H). More specifically, the terminals CN1 to CN11 of the terminals CN1 to CN21 included in the connector 34 of the first monitoring unit K1 are connected to connection points PS between the battery cells 22 in the first battery module M1 and its end points PE. The terminals CN12 to CN21 are connected to connection points PS and end points PE for the high-voltage battery cell group 24H in the second battery module M2.

In this structure, the 11th terminal CN11 and the 12th terminal CN12 in the first monitoring unit K1 are connected between the first battery module M1 and the second battery module M2. In the present embodiment, the 11th terminal CN11 and the 12th terminal CN12 are connected to both ends of a first wire W1 provided between the first battery module M1 and the second battery module M2, and serve as a specific terminal pair CTP. More specifically, the 11th terminal CN11 is connected to the high voltage end of the first wire W1, and the 12th terminal CN12 is connected to the low voltage end of the first wire W1.

The first monitoring unit K1 thus acquires 10 cell voltages VC from the first battery module M1 on the high voltage side of the first wire W1, and nine cell voltages VC from the second battery module M2 on the low voltage side of the first wire W1. In addition, the first monitoring unit K1 acquires the zero voltage VZ between the cell voltages VC acquired from the first battery module M1 and the cell voltages VC acquired from the second battery module M2. Consequently, as illustrated in FIG. 3, the map MP stores information composed of 10 identification symbols 1, one identification symbol 0, and nine identification symbols 1 arranged in this order, as the identifier ID associated with the first monitoring unit K1.

The second monitoring unit K2 acquires, among the battery cells 22 included in the second battery module M2, the cell voltages VC at the 11 battery cells 22 adjacent to the low voltage end (hereinafter, the low-voltage battery cell group 24L). In addition, the second monitoring unit K2 acquires the cell voltages VC at a high-voltage battery cell group 24H (including eight battery cells 22) in the third battery module M3. More specifically, the terminals CN1 to CN12 of the terminals CN1 to CN21 included in the connector 34 of the second monitoring unit K2 are connected to connection points PS and end points PE for the low-voltage battery cell group 24L in the second battery module M2. The terminals CN13 to CN21 are connected to connection points PS and end points PE for the high-voltage battery cell group 24H in the third battery module M3.

In this structure, the 12th terminal CN12 and the 13th terminal CN13 in the second monitoring unit K2 are connected between the second battery module M2 and the third battery module M3. In the present embodiment, the 12th terminal CN12 and the 13th terminal CN13 are connected to both ends of a second wire W2 provided between the second battery module M2 and the third battery module M3, and serve as a specific terminal pair CTP. More specifically, the 12th terminal CN12 is connected to the high voltage end of the second wire W2, and the 13th terminal CN13 is connected to the low voltage end of the second wire W2.

The second monitoring unit K2 thus acquires 11 cell voltages VC from the second battery module M2 on the high voltage side of the second wire W2, and eight cell voltages VC from the third battery module M3 on the low voltage side of the second wire W2. In addition, the second monitoring unit K2 acquires the zero voltage VZ between the cell voltages VC acquired from the second battery module M2 and the cell voltages VC acquired from the third battery module M3. Consequently, as illustrated in FIG. 3, the map MP stores information composed of 11 identification symbols 1, one identification symbol 0, and eight identification symbols 1 arranged in this order, as the identifier ID associated with the second monitoring unit K2.

The third monitoring unit K3 acquires the cell voltages VC at the low-voltage battery cell group 24L (including 12 battery cells 22) in the third battery module M3 and the cell voltages VC at the high-voltage battery cell group 24H (including seven battery cells 22) in the fourth battery module M4. More specifically, the terminals CN1 to CN13 of the terminals CN1 to CN21 included in the connector 34 of the third monitoring unit K3 are connected to connection points PS and end points PE for the low-voltage battery cell group 24L in the third battery module M3. The terminals CN14 to CN21 are connected to connection points PS and end points PE for the high-voltage battery cell group 24H in the fourth battery module M4.

In this structure, the 13th terminal CN13 and the 14th terminal CN14 in the third monitoring unit K3 are connected between the third battery module M3 and the fourth battery module M4. In the present embodiment, the 13th terminal CN13 and the 14th terminal CN14 are connected to both ends of a third wire W3 provided between the third battery module M3 and the fourth battery module M4, and serve as a specific terminal pair CTP. More specifically, the 13th terminal CN13 is connected to the high voltage end of the third wire W3, and the 14th terminal CN14 is connected to the low voltage end of the third wire W3.

The third monitoring unit K3 thus acquires 12 cell voltages VC from the third battery module M3 on the high voltage side of the third wire W3, and seven cell voltages VC from the fourth battery module M4 on the low voltage side of the third wire W3. In addition, the third monitoring unit K3 acquires the zero voltage VZ between the cell voltages VC acquired from the third battery module M3 and the cell voltages VC acquired from the fourth battery module M4. Consequently, as illustrated in FIG. 3, the map MP stores information composed of 12 identification symbols 1, one identification symbol 0, and seven identification symbols 1 arranged in this order, as the identifier ID associated with the third monitoring unit K3.

In this manner, the connectors 34 of different monitoring units K included in the battery system 100 have their specific terminal pairs CTP at different positions. More specifically, each monitoring unit K acquires cell voltages VC from a different number of battery cells 22 in the battery module M on the high voltage side of the corresponding wire W, and also acquires cell voltages VC from a different number of battery cells 22 in the battery module M on the low voltage side of the same wire W. This structure enables the identifiers ID associated with the monitoring units K to have an identification symbol 0 at different positions, thus allowing each monitoring unit K to generate a different identifier ID based on the position of its specific terminal pair CTP.

Each monitoring unit K, after generating the identifier ID, sends the cell voltages VC used for the generation of the identifier ID to the controller 10 as cell voltage data DV for use in the control of the assembled battery 20. That is, in the present embodiment, cell voltages VC are used as data for identifying monitoring units K and as data for controlling the assembled battery 20. This eliminates the need for generating separate data for the identification of the monitoring units K in addition to the data for controlling the assembled battery 20, thus preventing the monitoring units K from becoming complicated in structure.

According to the present embodiment described in detail above, the effects described below are achieved.

In the present embodiment, the battery system 100 includes the multiple monitoring units K and the assembled battery 20 having the multiple battery cells 22. Each monitoring unit K acquires cell voltages VC and the zero voltage VZ via the multiple terminals CN in the connector 34. The terminals CN in each monitoring unit K include, at a different position, a specific terminal pair CTP for acquiring the zero voltage VZ. Each monitoring unit K can generate a different identifier ID based on the position of the specific terminal pair CTP. Thus, the monitoring unit K may not have a preassigned identifier ID in it, which allows the battery system 100 to include identical monitoring units K.

The assembled battery 20 in the present embodiment has the battery modules M each including two or more battery cells 22, with the battery modules M connected in series via the wires W. Each monitoring unit K acquires the terminal voltage across the corresponding wire W as the zero voltage VZ. In the monitoring unit K, the component for acquiring the terminal voltage across each battery cell 22 may be identical to the component for acquiring the terminal voltage across the wire W. Thus, the monitoring units K may be identical, while having their specific terminal pairs CTP at different positions.

In the present embodiment, each monitoring unit K acquires cell voltages VC from a different number of battery cells 22 in the battery module M on the high voltage side of the corresponding wire W, and also acquires cell voltages VC from a different number of battery cells 22 in the battery module M on the low voltage side of the same wire W. This structure allows each monitoring unit K to generate a different identifier ID by acquiring the cell voltages VC at the battery cells 22 and also the zero voltage VZ with respect to the intermediate wire W.

In the present embodiment, the second battery module M2 includes the same number of battery cells 22 as the terminal voltages acquired from the second battery module M2 as cell voltages VC by the first monitoring unit K1 and the second monitoring unit K2. In this structure, the first monitoring unit K1 may acquire the cell voltages VC at the high-voltage battery cell group 24H in the second battery module M2, and the second monitoring unit K2 may acquire the cell voltages VC at the remaining low-voltage battery cell group 24L. This allows the second monitoring unit K2 to have its specific terminal pair CTP for acquiring the zero voltage VZ based on the second wire W2, at a position shifted so that the terminals CN of the specific terminal pair CTP have numbers one larger than those of the specific terminal pair CTP in the first monitoring unit K1 for acquiring the zero voltage VZ based on the first wire W1.

More specifically, the first monitoring unit K1 acquires the cell voltages VC at the nine battery cells 22 of the high-voltage battery cell group 24H, and thus the 10th terminal pair CT from the 21st terminal CN21, or the 11th terminal pair CT from the first terminal CN1, is the specific terminal pair CTP. The second monitoring unit K2 acquires the cell voltages VC at the 11 battery cells 22 of the low-voltage battery cell group 24L, and thus the 12th terminal pair CT from the first terminal CN1 is the specific terminal pair CTP.

In the structure used in the present embodiment, the number of battery cells 22 included in the second battery module M2 is the same as a sum of the number of terminal voltages acquired by the first monitoring units K1 from the second battery module M2 and the number of terminal voltages acquired by the second monitoring unit K2 from the second battery module M2. In this structure, a battery module M lower in voltage can be associated with a specific terminal pair CTP farther away from the first terminal CN1. This structure easily allows specific terminal pairs CTP to be positioned differently.

Second Embodiment

Figure 4:
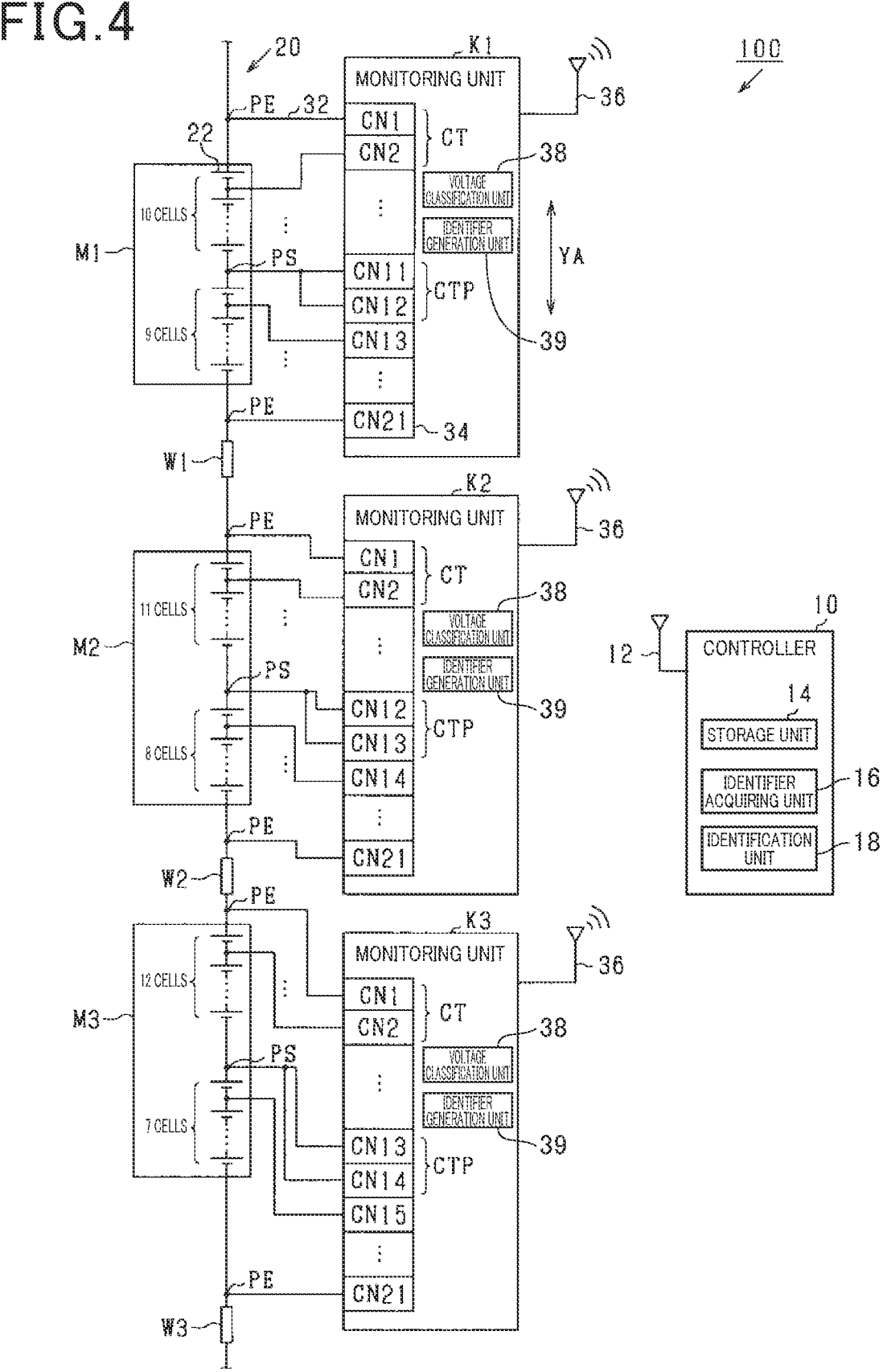
FIG. 4 is a schematic diagram illustrating a vehicle power supply system according to a second embodiment.

A second embodiment will now be described with reference to FIG. 4 by focusing on differences from the first embodiment. As illustrated in FIG. 4, the present embodiment is different from the first embodiment in that the battery modules M are associated one-to-one with the monitoring units K. More specifically, the first battery module M1 is associated with the first monitoring unit K1, the second battery module M2 is associated with the second monitoring unit K2, and the third battery module M3 is associated with the third monitoring unit K3.

In addition, the present embodiment is different from the first embodiment in that each monitoring unit K does not acquire the voltage across the wire W. In the present embodiment, any one of the 20 terminal pairs CT included in the connector 34 is commonly connected to a connection point PS between a pair of battery cells 22 to acquire the zero voltage VZ. In the present embodiment, the terminal pair CT commonly connected to the connection point PS is referred to as a specific terminal pair CTP.

As illustrated in FIG. 4, each battery module M in the present embodiment includes 19 battery cells 22, which are one less than the terminal voltages acquired by each monitoring unit K. The first monitoring unit K1 acquires the cell voltages VC at the battery cells 22 included in the first battery module M1. More specifically, the terminals CN1 to CN21 included in the connector 34 of the first monitoring unit K1 are connected to connection points PS between the battery cells 22 in the first battery module M1 and its end points PE. For the first monitoring unit K1, the 11th terminal CN11 and the 12th terminal CN12 are both connected to the connection point PS between the 10th battery cell 22 and the 11th battery cell 22 from the battery cell 22 at the highest voltage end, and serve as a specific terminal pair CTP.

The second monitoring unit K2 acquires the cell voltages VC at the battery cells 22 included in the second battery module M2. More specifically, the terminals CN1 to CN21 included in the connector 34 of the second monitoring unit K2 are connected to connection points PS between the battery cells 22 in the second battery module M2 and its end points PE. For the second monitoring unit K2, the 12th terminal CN12 and the 13th terminal CN13 are both connected to the connection point PS between the 11th battery cell 22 and the 12th battery cell 22 from the battery cell 22 at the highest voltage end, and serve as a specific terminal pair CTP.

The third monitoring unit K3 acquires the cell voltages VC at the battery cells 22 included in the third battery module M3. More specifically, the terminals CN1 to CN21 included in the connector 34 of the third monitoring unit K3 are connected to connection points PS between the battery cells 22 in the third battery module M3 and its end points PE. For the third monitoring unit K3, the 13th terminal CN13 and the 14th terminal CN14 are both connected to the connection point PS between the 12th battery cell 22 and the 13th battery cell 22 from the battery cell 22 at the highest voltage end, and serve as a specific terminal pair CTP.

In this manner, each of the monitoring units K included in the battery system 100 has a specific terminal pair CTP at a different position in the connector 34. More specifically, the battery module M associated with each monitoring unit K has a different number of battery cells 22 provided between the battery cells 22 at the highest voltage end and the connection point PS to which the specific terminal pair CTP is connected. Thus, each monitoring unit K can generate a different identifier ID based on the position of the specific terminal pair CTP.

According to this embodiment, each monitoring unit K has a specific terminal pair CTP, where the input terminals of the specific terminal pair CTP are commonly connected to a connection point PS between battery cells 22 in the corresponding battery module M to acquire the zero voltage VZ. In the monitoring unit K, the component for acquiring cell voltages VC may be identical to the component for acquiring the zero voltage VZ. The battery system 100 may thus include identical monitoring units K.

In the present embodiment, the battery cells 22 associated with each monitoring unit K for acquiring cell voltages VC include a different number of battery cells 22 provided between the battery cells 22 at the highest voltage end and the connection point PS to which the specific terminal pair CTP is connected. In this structure, when each monitoring unit K acquires the cell voltages VC at the battery cells 22 and also the zero voltage VZ through the specific terminal pair CTP commonly connected to the connection point PS, the monitoring unit K can generate a different identifier ID based on the position of the specific terminal pair CTP.

In the present embodiment, none of the monitoring units K acquire the voltage across the wire W. This allows the battery modules M and the monitoring units K to be arranged irrespective of the positions of the wires W.

Third Embodiment

Figure 5:
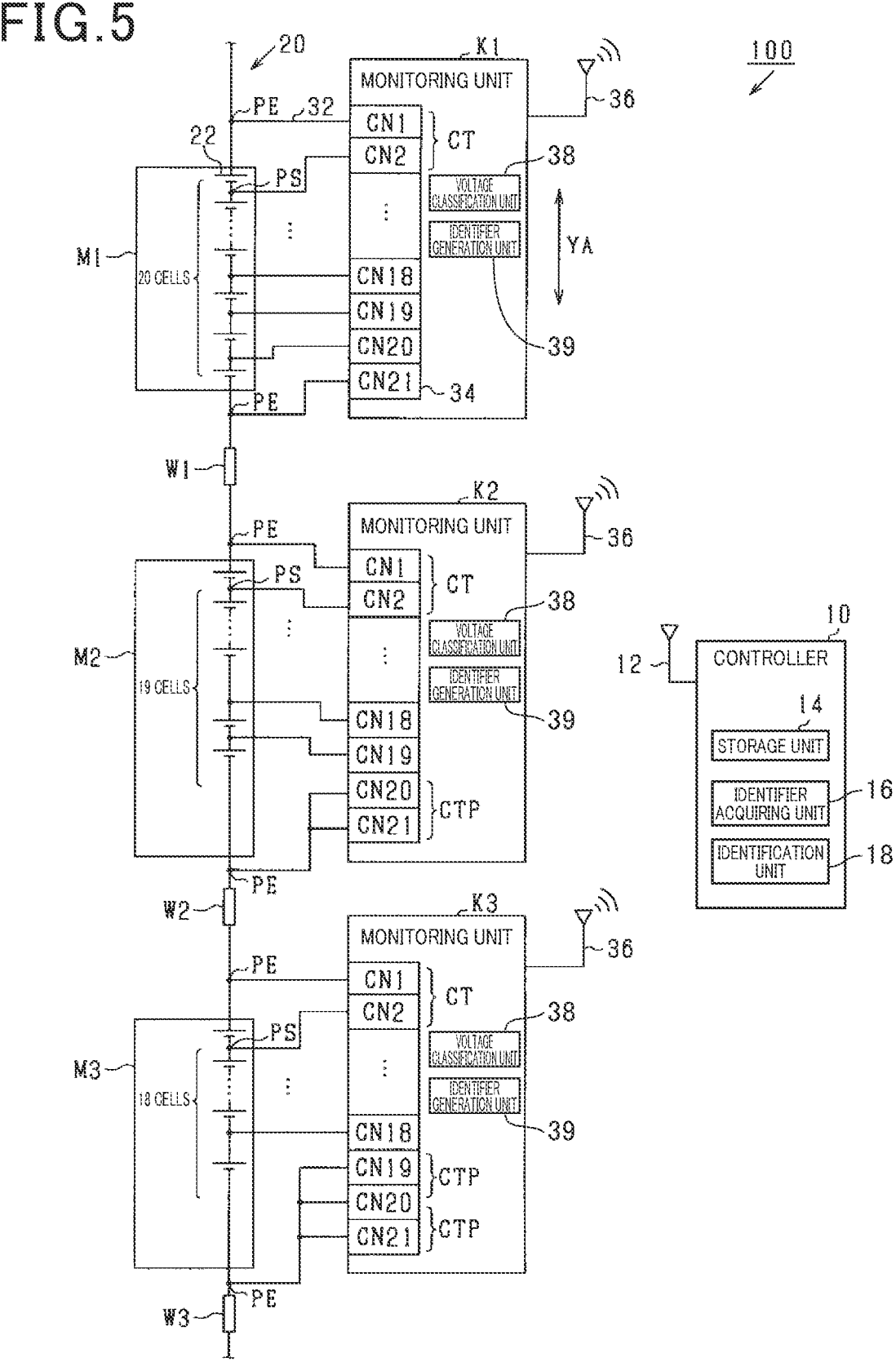
FIG. 5 is a schematic diagram illustrating a vehicle power supply system according to a third embodiment.

A third embodiment will now be described with reference to FIGS. 5 and 6 by focusing on differences from the first embodiment. As illustrated in FIG. 5, the present embodiment is different from the first embodiment in that the battery modules M are associated one-to-one with the monitoring units K.

In addition, the present embodiment is different from the first embodiment in that each monitoring unit K does not acquire the voltage across the wire W. In each of the monitoring units K except the first monitoring unit K1 according to the present embodiment, the connector 34 includes terminal pairs CT more than battery cells 22 from which cell voltages VC are acquired, and the one or more excess terminal pairs CT acquire no cell voltage VC. The terminal pairs CT that acquire no cell voltage VC are connected to a common end point PE for the battery cells 22 to acquire the zero voltage VZ. In the present embodiment, the terminal pairs CT connected to a common end point PE for the battery cells 22 are referred to as specific terminal pairs CTP.

As illustrated in FIG. 5, the first monitoring unit K1 acquires the cell voltages VC at 20 battery cells 22 included in the first battery module M1. More specifically, the terminals CN1 to CN21 included in the connector 34 of the first monitoring unit K1 are connected to connection points PS between the battery cells 22 in the first battery module M1 and its end points PE. The first monitoring unit K1 acquires the same number of terminal voltages as the battery cells 22 from which the cell voltages VC are acquired. The first monitoring unit K1 thus acquires no zero voltage VZ and has no specific terminal pair CTP.

FIG. 6 illustrates a map MP according to the present embodiment. As illustrated in FIG. 6, the map MP stores information composed of the string of 20 identification symbols 1 as the identifier ID associated with the first monitoring unit K1.

The second monitoring unit K2 acquires the cell voltages VC at 19 battery cells 22 included in the second battery module M2. More specifically, the terminals CN1 to CN21 included in the connector 34 of the second monitoring unit K2 are connected to connection points PS between the battery cells 22 in the second battery module M2 and its end points PE. The second monitoring unit K2 acquires one more terminal voltage than the number of battery cells 22 from which the cell voltages VC are acquired. For the second monitoring unit K2 in this structure, the 20th terminal CN20 and the 21st terminal CN21 are both connected to the low voltage end point PE of the second battery module M2, and serve as a specific terminal pair CTP.

Consequently, as illustrated in FIG. 6, the map MP stores information composed of 19 identification symbols 1 and one identification symbol 0 arranged in this order, as the identifier ID associated with the second monitoring unit K2.

The third monitoring unit K3 acquires the cell voltages VC at 18 battery cells 22 included in the third battery module M3. More specifically, the terminals CN1 to CN21 included in the connector 34 of the third monitoring unit K3 are connected to connection points PS between the battery cells 22 in the third battery module M3 and its end points PE. The third monitoring unit K3 acquires two more terminal voltages than the number of battery cells 22 from which the cell voltages VC are acquired. For the third monitoring unit K3 in this structure, the 19th terminal CN19 and the 20th terminal CN20 are both connected to the low voltage end point PE of the third battery module M3, and serve as a specific terminal pair CTP. Also, the 20th terminal CN20 and the 21st terminal CN21 are both connected to the same end point PE and serve as another specific terminal pair CTP.

Consequently, as illustrated in FIG. 6, the map MP stores information composed of 18 identification symbols 1 and two identification symbols 0 arranged in this order, as the identifier ID associated with the third monitoring unit K3.

In this manner, each of the monitoring units K included in the battery system 100 has a different number of specific terminal pairs CTP in the connector 34. More specifically, each monitoring unit K acquires the same number of terminal voltages and acquires cell voltages VC from a different number of battery cells 22. All terminal pairs CT that acquire no cell voltage VC acquire the zero voltage VZ. Thus, each monitoring unit K can generate a different identifier ID based on the number of specific terminal pairs CTP.

According to this embodiment, all specific terminal pairs CTP of each monitoring unit K are connected to the low voltage end point PE of the corresponding battery module M to acquire the zero voltage VZ. In the monitoring unit K, the component for acquiring cell voltages VC may be identical to the component for acquiring the zero voltage VZ. The battery system 100 may thus include identical monitoring units K.

In the present embodiment, each monitoring unit K acquires the same number of terminal voltages and acquires cell voltages VC from a different number of battery cells 22. All terminal pairs CT that acquire no cell voltage VC acquire the zero voltage VZ. Thus, each monitoring unit K can generate a different identifier ID based on the number of specific terminal pairs CTP for acquiring the zero voltage VZ.

In the present embodiment, none of the monitoring units K acquire the voltage across the wire W. This allows the battery modules M and the monitoring units K to be arranged irrespective of the positions of the wires W. Each monitoring unit K also has specific terminal pairs CTP all connected to the end point PE for the battery cells 22. This common connection of specific terminal pairs CTP is easier than to a connection point PS.

OTHER EMBODIMENTS

Each of the embodiments described above may be modified as described below.

The number of terminals included in the connector 34 of a monitoring unit K may be not only 21 but also three or more and less than 21, or 22 or more. Similarly, the number of battery cells 22 included in a battery module M may be not only 10, 19, or 20 but also another natural number of at least two.

In the above examples, the threshold voltage VA for separating cell voltages VC from the zero voltage VZ is a constant value. However, in other examples, the threshold voltage VA may be the average value of the 20 acquired terminal voltages.

In the first embodiment, the first battery module M1 may include 20 battery cells 22. In this structure, the battery system 100 may include battery modules M that are all identical. In addition, the battery modules M may include the same number of battery cells 22 as the terminal voltages acquired by the monitoring units K. This structure allows a monitoring unit K to have a specific terminal pair CTP at a position shifted so that its terminals CN have numbers incremented by one from those of the specific terminal pair CTP in the adjacent monitoring unit K on the high voltage side.

The number of battery cells 22 included in a battery module M may be different from the number of terminal voltages acquired by the monitoring unit K. For example, each battery module M may include N battery cells 22 (where N is a natural number of at least two), and each monitoring unit K may acquire M terminal voltages (where M is a natural number of at least two). In this case, if the total number of battery cells 22 included in the assembled battery 20 is smaller than the least common multiple of N+1 and M, all monitoring units K may have different identifiers ID.

In the second embodiment, for each monitoring unit K, the number of battery cells 22 is specified between the battery cells 22 at the highest voltage end and the connection point PS to which the specific terminal pair CTP is connected. However, the embodiment is not limited to this example. For example, for each monitoring unit K, the number of battery cells 22 may be specified between the battery cells 22 at the lowest voltage end and the connection point PS to which the specific terminal pair CTP is connected. In other cases, for each monitoring unit K, the number of battery cells 22 may be specified between the battery cells 22 at the highest voltage end and the connection point PS to which the specific terminal pair CTP is connected, and also the number of battery cells 22 may be specified between the battery cells 22 at the lowest voltage end and the connection point PS to which the specific terminal pair CTP is connected.

In the third embodiment, specific terminal pairs CTP are connected to the low voltage end point PE of the battery module M. However, the embodiment is not limited to this example. Specific terminal pairs CTP may be connected to the high voltage end point PE. In other cases, specific terminal pairs CTP may be connected to a connection point PS between battery cells 22.

In the third embodiment, for each monitoring unit K, the corresponding battery module M includes a different number of battery cells 22 and accordingly has a different voltage between its end points PE. Thus, each monitoring unit K may be identified by the voltage between the end points PE along with or in place of the identifier ID.

In the above embodiments, the identification procedure and the identifier generation procedure are performed when the vehicle starts up. However, the embodiments are not limited to this example. For example, the procedures may be performed when the vehicle is assembled. In the case in which the identification procedure is performed when the vehicle is assembled, the state of charge of each battery cell 22 or a particular battery cell 22 may be changed from the state of charge of other battery cells 22 before the assembled battery 20 is installed. The controller 10 can recognize each monitoring unit K by the difference in the voltage across each battery cell 22 due to the difference in the state of charge.

In the above embodiments, the map MP associates each monitoring unit K with the entire identifier ID. However, the monitoring unit K may not be associated with the entire identifier ID. For example, if the identifiers ID of different monitoring units K have different numbers of identification symbols 1 arranged before the identification symbol 0, each monitoring unit K may be associated with the number of identification symbols 1.

In the above embodiments, the controller 10 is connected to the monitoring units K without a communication line, and the controller 10 acquires information such as identifiers ID from the monitoring units K through wireless communication. However, the embodiments are not limited to this example. The controller 10 may be connected to the monitoring units K with a communication line, and the controller 10 may acquire information such as identifiers ID from the monitoring units K through wired communication. For example, if the controller 10 and the monitoring units K are connected in a ring with a communication line, identifiers ID can be generated based on the order in which the monitoring units K are connected or alternatively based on the cell voltages VC and the zero voltage VZ.

What is claimed is:

1. A battery system comprising:
   an assembled battery having a plurality of battery cells connected in series;
   a plurality of monitoring units connected to the assembled battery and configured to receive a cell voltage across each of the plurality of battery cells, each of the plurality of monitoring units including a same number of input terminals connected to the plurality of battery cells; and
   an identifier generation unit configured to generate, for the each of the plurality of monitoring units, an identifier of the each of the plurality of monitoring units based on a terminal voltage between a pair of the input terminals of the each of the plurality of monitoring units.

2. The battery system according to claim 1, wherein
   the assembled battery includes a plurality of battery modules connected in series, each of the plurality of battery modules including two or more of the plurality of battery cells, and
   the input terminals in the each of the plurality of monitoring units includes a set of two or more of the input terminals that are commonly connected to an inter-cell connection point or an inter-module connection point.

3. The battery system according to claim 2, wherein
   the set of two or more of the input terminals differ from one of the plurality of monitoring units to another of the plurality of monitoring units.

4. The battery system according to claim 2, wherein
   the same number of input terminals in the each of the plurality of monitoring units is greater than a sum of a number of inter-cell connection points and a number of inter-module connection points for one of the plurality of battery modules connected to the each of the plurality of monitoring units.

5. The battery system according to claim 1, further comprising a voltage classification unit configured to determine whether a terminal voltage at a pair of the input terminals is higher than a predetermined threshold voltage.

6. The battery system according to claim 5, wherein
   the identifier generation unit is configured to generate, for the each of the plurality of monitoring units, the identifier of the each of the plurality of monitoring units based on a result of determination made by the voltage classification unit.

7. The battery system according to claim 5, wherein
   a position of the pair of input terminals, having the terminal voltage lower than the predetermined threshold voltage, differs from one of the plurality of monitoring units to another of the plurality of monitoring units.

8. The battery system according to claim 5, wherein
   the identifier generation unit is configured to assign an identification symbol to the terminal voltage at the pair of input terminals based a result of determination made by the voltage classification unit.

9. The battery system according to claim 1, further comprising a controller configured to recognize each of the plurality of monitoring units based on a difference in voltage across each battery cell of the plurality of battery cells caused by a difference in state of charge.

10. The battery system according to claim 1, wherein the identifier generation unit is configured to generate, for the each of the plurality of monitoring units, the identifier of the each of the plurality of monitoring units based on an order of the input terminals in the each of the plurality of monitoring units.

11. The battery system according to claim 1, wherein
    the assembled battery includes a plurality of battery modules, each of the plurality of battery modules including two or more of the plurality of battery cells and connected in series via a connection member,
    the input terminals in the each of the plurality of monitoring units include one specific terminal pair for acquiring a zero voltage,
    the one specific terminal pair in the each of the plurality of monitoring units is connected to both ends of the connection member such that the each of the plurality of monitoring units acquires a terminal voltage across the connection member as the zero voltage.

12. The battery system according to claim 1, wherein
    the input terminals in the each of the plurality of monitoring units include one specific terminal pair for acquiring a zero voltage, and
    for the each of the plurality of monitoring units, ones of the plurality of battery cells from which a cell voltage is acquired include a different number of the plurality of battery cells provided between a battery cell of the plurality of battery cells at a highest voltage end or at a lowest voltage end, and a connection point between a pair of the plurality of battery cells to which the input terminals of the one specific terminal pair are commonly connected, such that the each of the plurality of monitoring units has the specific terminal pair at a different position.

13. The battery system according to claim 1, wherein
    the each of the plurality of monitoring units acquires an identical number of terminal voltages and is associated with a different number of the plurality of battery cells from which terminal voltages are acquired, and in the each of the plurality of monitoring units, a zero voltage is input at every terminal pair configured to acquire no terminal voltage from the plurality of battery cells, such that the each of the plurality of monitoring units has a different number of specific terminal pairs.

14. The battery system according to claim 1, further comprising a controller configured to communicate with the each of the plurality of monitoring units, the controller comprising:
    a storage unit configured to store a map associating the plurality of monitoring units with identifiers;
    an identifier acquiring unit configured to acquire the identifier from the identifier generation unit; and an identification unit configured to search the map for the identifier acquired by the identifier acquiring unit to identify the each of the plurality of monitoring units.

15. A controller incorporated in a battery system, the battery system comprising:
an assembled battery having a plurality of battery cells connected in series; and
a plurality of monitoring units each including a plurality of input terminals to receive a cell voltage from both ends of each of the plurality of battery cells,
wherein each of the plurality of monitoring units comprises a voltage classification unit configured to classify a terminal voltage between each pair of the plurality of input terminals as the cell voltage or as a zero voltage, the zero voltage being a terminal voltage of substantially zero,
the plurality of input terminals in each of all or all but one of the plurality of monitoring units include at least one specific terminal pair for acquiring the zero voltage at a different position and/or include a different number of specific terminal pairs for acquiring the zero voltage,
the each of the plurality of monitoring units further comprises an identifier generation unit configured to generate an identifier based on either the position of the at least one specific terminal pair or the number of specific terminal pairs, wherein
the controller is configured to communicate with the each of the plurality of monitoring units, the controller comprising:
a storage unit configured to store a map associating the plurality of monitoring units with identifiers;
an identifier acquiring unit configured to acquire the identifier from the each of the plurality of monitoring units; and
an identification unit configured to search the map for the identifier acquired by the identifier acquiring unit to identify a monitoring unit from which the identifier is acquired.

16. A monitoring unit incorporated in a battery system, the battery system comprising an assembled battery formed of a plurality of battery modules each including two or more of battery cells and connected in series, the monitoring unit comprising:
a plurality of input terminals to receive a cell voltage from both ends of each of the two or more of battery cells included in a corresponding one of the plurality of battery modules,
a voltage classification unit configured to classify a terminal voltage between each pair of the plurality of input terminals as the cell voltage or as a zero voltage, the zero voltage being a terminal voltage of substantially zero,
wherein
the plurality of input terminals in the monitoring unit include at least one specific terminal pair for acquiring the zero voltage at a different position and/or include a different number of specific terminal pairs for acquiring the zero voltage,
the monitoring unit further comprises an identifier generation unit configured to generate an identifier based on either the position of the at least one specific terminal pair or the number of specific terminal pairs.

17. A battery system comprising:
an assembled battery having a plurality of battery cells connected in series;
a plurality of identical monitoring units connected to the assembled battery and configured to receive a cell voltage across each of the plurality of battery cells, each of the plurality of identical monitoring units includes a same number of input terminals connected to the plurality of battery cells; and
an identifier generation unit configured to generate, for the each of the plurality of identical monitoring units, an identifier of the each of the plurality of monitoring units based on a terminal voltage between a pair of the input terminals of the each of the plurality of monitoring units.

18. A battery system comprising:
an assembled battery having a plurality of battery cells connected in series;
a plurality of monitoring units connected to the assembled battery and configured to receive a cell voltage across each of the plurality of battery cells, each of the plurality of monitoring units including a same number of input terminals connected to the plurality of battery cells and having no stored identifier information to discriminate itself from other monitoring units of the plurality of monitoring units; and
an identifier generation unit configured to generate, for the each of the plurality of monitoring units, an identifier of the each of the plurality monitoring units based on a terminal voltage between a pair of the input terminals of the each of the plurality of monitoring units.

* * * * *